(12) United States Patent
Singh et al.

(10) Patent No.: US 8,321,603 B2
(45) Date of Patent: Nov. 27, 2012

(54) RECHARGEABLE DEVICE AND METHOD FOR DETERMINING UNIVERSAL SERIAL BUS PORT TYPE

(75) Inventors: Somvir Singh, Noida (IN); Asif Iqbal, Noida (IN); Rajan Kapoor, Faridabad (IN)

(73) Assignee: Freescale Semiconductor, Inc., Austin, TX (US)

( * ) Notice: Subject to any disclaimer, the term of this patent is extended or adjusted under 35 U.S.C. 154(b) by 53 days.

(21) Appl. No.: 12/844,841

(22) Filed: Jul. 28, 2010

(65) Prior Publication Data

US 2012/0030381 A1    Feb. 2, 2012

(51) Int. Cl.
  *G06J 3/00*  (2006.01)
  *H02J 7/00*  (2006.01)
(52) U.S. Cl. ............................. 710/16; 710/17; 320/138
(58) Field of Classification Search .................. 320/138; 710/14, 16, 17
   See application file for complete search history.

(56) References Cited

U.S. PATENT DOCUMENTS

| | | | |
|---|---|---|---|
| 6,507,172 B2 | 1/2003 | Sherman | |
| 7,358,703 B2 | 4/2008 | Veselic | |
| 7,679,316 B2 | 3/2010 | Guthrie | |
| 2003/0030412 A1* | 2/2003 | Matsuda et al. | 320/127 |
| 2003/0054703 A1* | 3/2003 | Fischer et al. | 439/894 |
| 2008/0272741 A1* | 11/2008 | Kanamori | 320/137 |
| 2008/0303486 A1* | 12/2008 | Kao et al. | 320/139 |
| 2009/0184688 A1* | 7/2009 | Kim et al. | 320/162 |
| 2009/0295339 A1 | 12/2009 | Wong | |
| 2010/0070659 A1* | 3/2010 | Ma et al. | 710/14 |
| 2010/0164440 A1* | 7/2010 | Ikeda | 320/162 |
| 2010/0293302 A1* | 11/2010 | Fujii et al. | 710/16 |

OTHER PUBLICATIONS

Kanamori, USB battery-charger designs meet new industry standards, Feb. 21, 2008, Texas Instrument, pp. 1-12.*

* cited by examiner

*Primary Examiner* — Ernest Unelus
(74) *Attorney, Agent, or Firm* — Charles Bergere

(57) ABSTRACT

A method for detecting a type of a port connected to a USB connector and a rechargeable device with a USB connector, a USB controller and a power management module. The power management module selectively powers up the USB controller depending on the type of port connected to the USB connector. A hardware detector is connected to the USB connector for determining the port type. If the port type is for recharging only then the power management module does not enable power to the USB controller.

15 Claims, 3 Drawing Sheets

RECHARGEABLE DEVICE AND METHOD FOR DETERMINING UNIVERSAL SERIAL BUS PORT TYPE

BACKGROUND OF THE INVENTION

This invention relates to a rechargeable device and a method for detecting a Universal Serial Bus (USB) port type when the rechargeable device is connected to a USB port.

The universal serial bus (USB) standard and its supplements define a bus and protocols that facilitate an exchange of data and, additionally or alternatively, of power between devices. The USB bus is a four wire interface with a differential pair (D+ and D− lines) for data, a ground line and a voltage line (VBUS).

The battery charging specification of the USB 2.0 standard defines different types of ports, namely: (i) a standard host that is primarily used for data transfer, having limited charging capacity due to current limits imposed by USB specifications (ii) a charging host that can be used for data transfer as well as a fully capable charger with up to 1.5 A current useable for charging, and (iii) a dedicated charger with up to 1.8 A current used only for charging a power supply of a portable device with no data transfer.

A rechargeable device may detect when it is attached to a USB port, that is, physically connected to the port. A supply voltage, for example, a 5V supply voltage may become available to the rechargeable device via a voltage contact. Prior art USB port type detection methods do not differentiate between the standard host, charging host, and dedicated charger until a USB controller of the rechargeable device has applied a pull-up on the positive data (D+) line. The USB controller is a link layer entity. Thus, the link layer and the physical layer of the rechargeable device must be turned on (powered up) in order to apply the pull-up on the D+ line. However, if the chargeable device has a dead battery or very little power, it may not be able to properly power up the USB controller, which could cause the rechargeable device to lock-up.

In order to conserve power, improve the time required to charge a chargeable device, and prevent device lock-up, it would be advantageous to be able to determine the USB port type prior to powering up the USB controller.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF PREFERRED EMBODIMENTS

The illustrated embodiments of the present invention may for the most part be implemented using electronic components and circuits known to those skilled in the art, so details will not be explained in any greater extent than that considered necessary as illustrated above, for the understanding and appreciation of the underlying concepts of the present invention and in order not to obfuscate or distract from the teachings of the present invention.

The illustrated method and rechargeable device provide an early detection of the type of port that is connected to the rechargeable device. This early detection can be executed by a hardware detector without powering up the USB controller or otherwise activating the link layer and the physical layer components of the rechargeable device. Since the USB controller is not awakened, power is conserved. In addition, early detection also may be used to prevent the USB controller from causing the rechargeable device to display unnecessary port type identification information to a user. For example, the rechargeable device may be a mobile phone or a Personal Data Accessory (PDA) that presents a dialogue box to a user when attached to a USB Port asking the user to select between possible identification modes, for example, whether the rechargeable device shall identify itself as a memory device, a camera, a modem, etc. If the rechargeable device is connected to a dedicated charger, these choices have no meaning and should not be displayed to the user.

The hardware detector may detect a dedicated charger by sensing a short between the positive data (D+) line and the negative data (D−) line connected to the USB connector. The short is sensed without waiting for the USB controller to do connect signalling and apply a pull-up on the D+ line. The short is sensed by the hardware detector by sensing the voltage of the D− line after applying a high voltage to the D+. The short can be sensed immediately after the high D+ line propagates through a short between the D+ line and the D− line.

Figure 1:
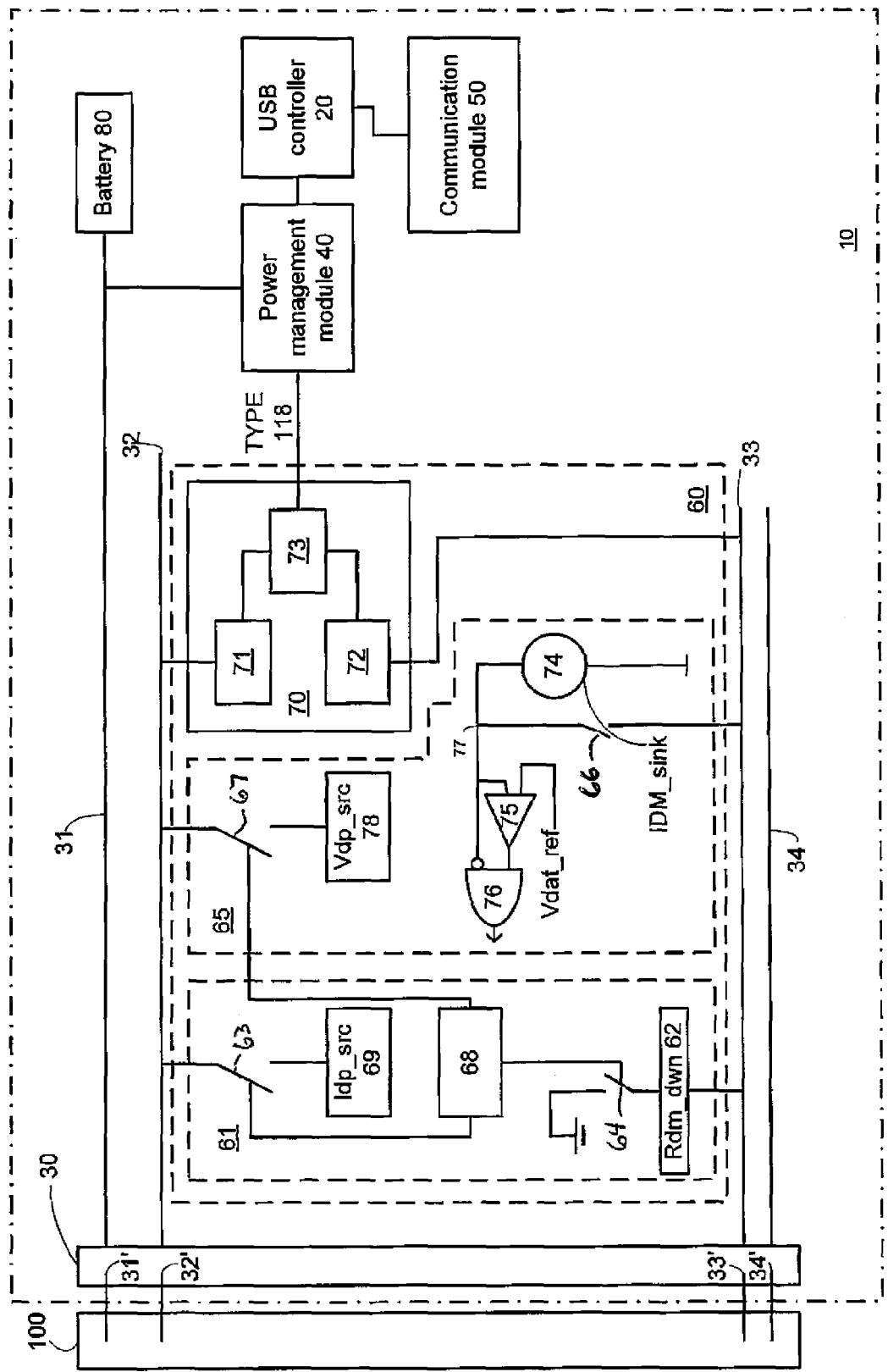
FIG. 1 is a schematic diagram of a rechargeable device and a port in accordance with an embodiment of the present invention.

Referring now to FIG. 1, a schematic diagram of an embodiment of a rechargeable device 10 and a port 100 is shown. The rechargeable device 10 includes a universal serial bus (USB) controller 20, a USB connector 30, a power management module 40, a communication module 50, a hardware detector 60, and a battery 80. The USB connector 30 includes a voltage bus (VBUS) contact 31', a positive data (D+) contact 32', a negative data (D−) contact 33' and a ground contact 34'. These contacts are respectively connected to a VBUS line 31, D+ line 32, D− line 33 and ground line 34.

The port 100 is connected to the rechargeable device 10 via the USB connector 30. As previously discussed, there are multiple types of ports and the rechargeable device 10 may respond to the different types of ports in different manners. For example, the port 100 may be a dedicated charger that provides current but is not capable of (or is otherwise prevented from) exchanging data with the rechargeable device 10. In this case the rechargeable device 10, since it will be charging, in order to reduce its power consumption, may keep one or more of it's other component circuits idle, such as the communication module 50, a CPU (not shown), or the USB controller 20, while the port 100 is connected to the rechargeable device 10. These elements may be powered down at least during a charging period of the rechargeable device 10.

If the port 100 is a charging host (as opposed to a dedicated charger) or a standard host, then the port 100 can communicate with the rechargeable device 10 and exchange information via the USB connector 30, in which case the various elements (such as the communication module 50 and the USB controller 20) of the rechargeable device 10 may be powered up while the rechargeable device 10 is connected to the port 100.

The rechargeable device 10 detects that it is attached to the port 100 and then determines the type of the port 100. In one embodiment, the determination of the type of the port 100 involves: (i) sending, by the rechargeable device 10, over the D+ line 32 a port type query signal (denoted Q 111) to the port 100, and (ii) waiting for a response from the port 100. A port type response signal (denoted R 112) is provided over the D− line 33 or an absence of R 112 during at least a predetermined period.

One way to determine the type of the port 100 is to measure the delay between the reception of Q 111 and the provision of R 112 or even by the absence of a response. For example, a dedicated charger port type may be expected to short (with a resistance) the D+ line 32 and the D− line 33. Thus, a dedicated charger type port introduces a very short delay (see FIG. 2, Ddc 113) between the reception of Q 111 and the provision of R 112. This delay may be a RC delay and is expected to be less than 1 millisecond.

If the port 100 is a charging port, then the charging port is capable of communicating with the rechargeable device 10, and does not short the D+ and D− lines 32, 33. A charging host introduces a delay (FIG. 2, Dch 119) of about 1 millisecond between the reception of Q 111 and the provision of R 112. If the port 100 is a standard host then the port 100 is capable of communicating with the rechargeable device 10 and is not expected to provide R 112 within a period of 40 milliseconds. Thus, the standard host type port may not provide R 112 at all or provide R 112 after a longer delay (FIG. 2, Dsh 114), e.g., a delay greater than 1 mS, such as about 40 mS.

In one embodiment of the present invention, the hardware detector 60 senses the provision of Q 111 over the D+ line 32, and monitors the D− line 33 to detect whether and when R 112 is received. The hardware detector 60 includes two or more predefined periods that compared to a delay time between the provision of Q 111 on the D+ line and receipt of R 112 on the D− line. For example, two predetermined periods may be defined, a first period (FIG. 2, PP1 131) that is shorter than Dch 119 but longer then Ddc 114, and a second period (PP2 132) that is much longer than Ddc 113 and longer than Dch 119, and substantially equal to Dsh 114.

If the time difference (Dactual 116) between the appearance of Q 111 on the D+ line 32 and detection of R 112 on the D− line 33 is less than the first period PP1 131 then the hardware detector 60 determines that the port is a dedicated charger. If Dactual 116 is between the appearance of Q 111 on the D+ line 32 and detection of R 112 on the D− line 33 is between the first and second periods PP1 131 and PP2 132, then the hardware detector 60 determines that the port is a charging host. Finally, if the hardware detector does not detect R 112 on the D− line 33 after the appearance of Q 111 within the second period PP2 then the port is determined to be a standard host.

It should be noted that a USB controller such as the USB controller 30 typically determines a port type in about 1 second or longer. For example, a conventional USB controller may perform the following steps to detect port type: (i) receiving, immediately after the port is attached to the rechargeable device, a high VBUS voltage; (ii) detect data line contact detection by the rechargeable device; (iii) determine whether the port is a standard host or a charging port by applying a voltage (0.7 v) on the D+ line; (iv) determine whether a voltage is applied to the D− line that is greater than a reference voltage (0.4 v) within 40 mS. If the voltage of the D− line does not go above 0.4 volts within 40 mS then the rechargeable device determines that the port is a standard host, else the rechargeable device determines that the port is a charging port; (v) if the port is a charging port the rechargeable device powers up a USB controller (and may supply power to additional elements such as PHY layer elements); (vi) The USB controller performs a signalling session to differentiate between the dedicated charger and the charging host. This step (step vi) is referred as 'connect signalling.' If the USB controller determines that the port is a dedicated charger (that is not capable of communicating with the rechargeable device) then the USB controller may be shut down after such determination.

As previously discussed, before detecting the port type, the current consumption of the rechargeable device may be very limited, for example, if the battery is largely depleted, the device may not be able to consume more than 100 mA. This limited current consumption can contribute to lock-up situations in which the rechargeable device fails to boot because the battery is not charged to a level sufficient for booting. Without booting, the rechargeable device may be unable to detect the port type due to lack of connect signalling. The rechargeable device may have a dead battery that may prevent it from powering up. Yet another problem is that if the battery is mostly depleted and delivers low current to the rechargeable device, it may take an exceedingly long time for the link layer to power up and signal a connect. It may even happen that the battery never reaches this threshold. Another special case may be when the battery of the rechargeable device is drained before the detection of the port type, causing the rechargeable device to lock-up. A rechargeable device in accordance with the present invention is able to avoid such lock-up or delayed boot situations. Further, it should be appreciated that both PP1 131 and PP2 132 are shorter and even much shorter than the typical USB controller port type detection period (compare 40 mS for PP2 132 vs. 1 second).

Referring again to FIG. 1, the hardware detector 60 may include an attachment detection circuit 61, a signalling circuit 65 and a port type detector 70. The attachment detection circuit 61 utilizes the VBUS, D+, D−, and ground contacts 31', 32', 33' and 34', while the signalling circuit 65 and the port type detector 70 utilize the D+ and D− lines 32, 33.

The port type detector 70 may include: (i) a positive data line detection circuit 71 for either asserting and/or detecting the port type query signal (Q 111) on the D+ line 32; (ii) a negative data line detection circuit 72 for monitoring the D− line 33; and (iii) a timing unit 73 the measure the time between Q 111 and R 112 for determining the port type. The timing unit 73 generates a port type indicator TYPE 118 that indicates the type of the port 100. TYPE 118 may be sent to the power management module 40 of the rechargeable device 10.

The hardware detector 60 and especially the port type detector 70 thereof may exhibit low power consumption by including a relatively small number of components. The hardware detector 60 can quickly determine the type of the port 100 without the assistance of the USB controller 20. Thus, the USB controller 20 may remain idle, and preferably not even powered up) until the completion of the detection of the type of the port 100 and longer if the port 100 is a dedicated charger. The power consumption of the USB controller 20 is higher (and usually much higher) than the power consumption of the hardware detector 60, so the by using the hardware detector and not the USB controller 20, power is conserved. The USB controller 20 usually includes multiple components and additionally requires a processor or other circuits capable of executing software that also drain the power.

The USB controller 20 may be configured to execute software that determines the port type. The software may exchange signals with the port 100 or with the signalling circuit 65. The software of the USB controller 20 that communicates with the signalling circuit 65 may be disabled (or not installed) if the hardware detector 60 is used for determining the type of the port 100. The USB controller 20 also may perform USB device layer functions, and additionally or alternatively, functional layer functions.

In one embodiment of the present invention, the power management module 40 receives TYPE 118 and may selectively supply power to the USB controller 20 based on the value of TYPE 118. Thus, the power management module 40 provides power to the USB controller 20 in response to the type of the port 100. If, for example, TYPE 118 indicates that the port 100 is a dedicated charger (or any other port 100 that is prevented from exchanging data with the rechargeable device 10) then the power management module 40 does not enable power to the USB controller 20. If, for example, TYPE 118 indicates that the port 100 is capable of communicating with the rechargeable device 10 then the power management module 40 will enable power to the USB controller 20.

The power management module 40 also may selectively enable power to be provided to the communication module 50 based on the type of the port 100. If, for example, the port 100 is a dedicated charger then the power management module 40 may not enable power to the communication module 50. It is noted that although the communication module 40 and USB controller 20 appear in FIG. 1 as distinct entities, the actual circuits of these two modules could be combined. For example, the USB controller 20 could perform communication related tasks and could even include the communication module 50.

The attachment detection circuit 61 is configured to detect the attachment of a port 100 to the rechargeable device 10. In one embodiment, the attachment detection circuit includes a current source (Idp_src) 69 that is connected via a switch 63 to the D+ line 32 and a pull down resistor (Rdm_dwn) 62 that is connected between the D− line 33 and ground via a switch 64. The attachment detection circuit 61 also includes logic 68 for controlling the switches 63 and 64 and determining whether the pull-down resistor 62 pulled down the D+ line.

The signalling circuit 65 may be activated by the USB controller 20 to detect the type of port 100. The signalling circuit 65 is inactive when the detection of the type of port 100 is executed by the port type detector 70. In one embodiment, the signalling circuit 65 includes a switch 66, a current sink (IDM_sink) 74, a comparator 75 and an OR gate 76 having one of it's inputs inverted. The switch 66 is connected between the inverted input of the OR gate 76 and the D− line 33. A node 77 is located between the switch and the OR gate 76 inverted input. The current sink (IDM_sink) 74 is connected between ground and the node 77. The comparator 75 compares the voltage at the node 77 to a reference voltage (Vdat_ref) and outputs a comparison signal that is input to a non-inverting input of the OR gate 76. The switch 66 is activated by the USB controller 20 to be closed and connect the node 77 to the D− line 33. In addition, a voltage supply (Vdp_src) 78 is connected via a switch 67 (that also is controlled by the USB controller 20) to the D+ line 32. If nothing is attached to the rechargeable device 10 via the USB connector 30 then the D− line 33 is pulled down by the current sink (IDM_sink) 74. If, for example a dedicated port 100 is connected to the rechargeable device 10, then the voltage on the D− line is high.

The battery 80 is connected to voltage bus (VBUS) 31 either directly or via the power management module 40. The power management module 40 can receive power from the voltage bus 31. The battery 80 is recharged via the port 100 during a charging period. The charging period may start once the port 100 is connected to the rechargeable device 10 or immediately after attachment. The charging period may end when the port 100 is disconnected from the rechargeable device 10.

Figure 2:
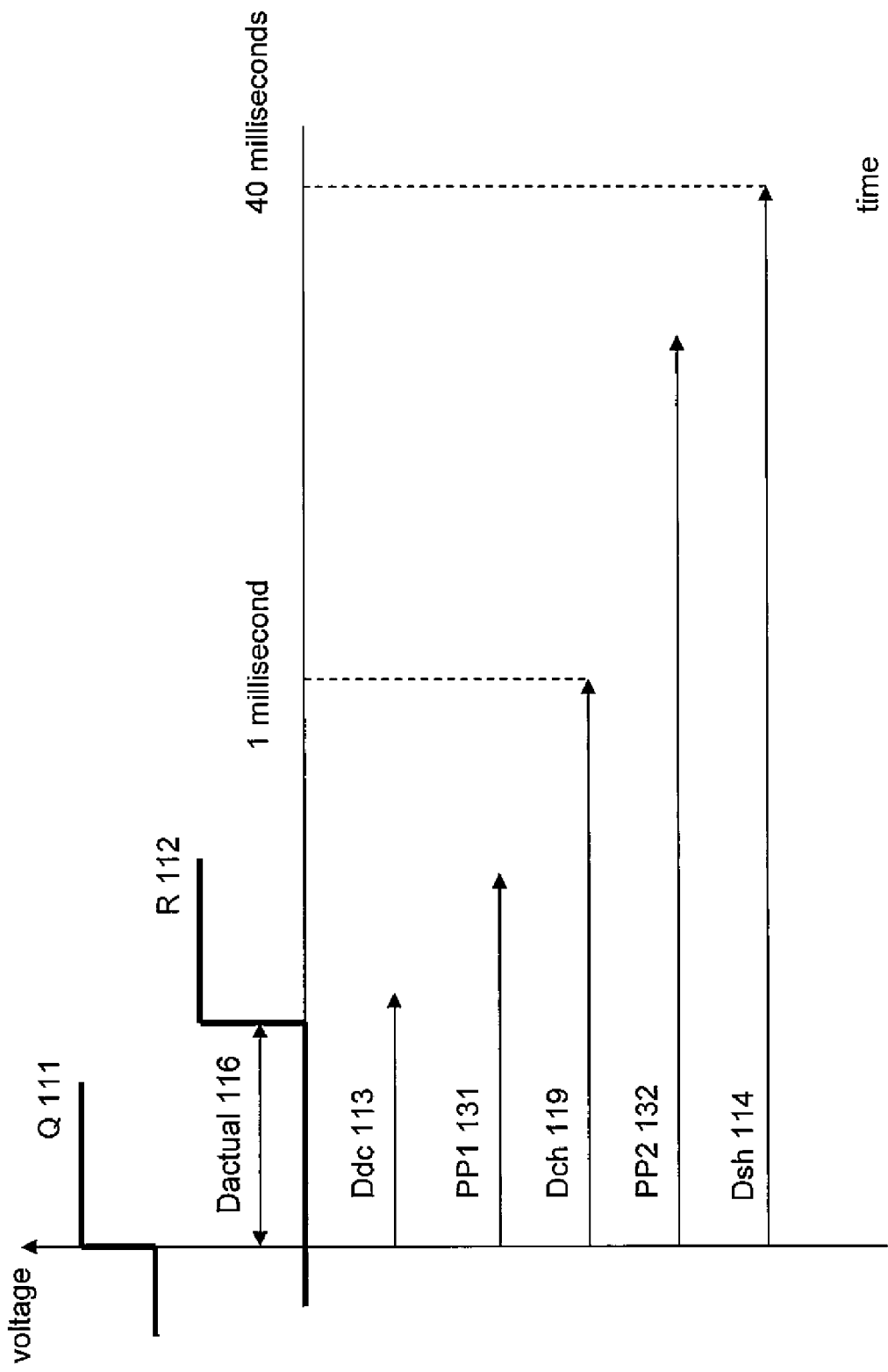
FIG. 2 is a timing diagram that illustrates various signals, as well as various periods, of the rechargeable device of FIG. 1.

FIG. 2 is a timing diagram that illustrates various signals including Q 111 and R 112 for a dedicated charger, as well as various periods (PP1 and PP2), according to an embodiment of the invention. It should be understood that FIG. 2 is not drawn to scale in order to more clearly illustrate the signals of the present embodiment. FIG. 2 shows an example where Dactual 116 equals Ddc 113, Dch 119 is about 1 millisecond, PP1 131 is a fraction of 1 millisecond, and PP2 132 and Dsh 114 are about 40 milliseconds long.

Figure 3:
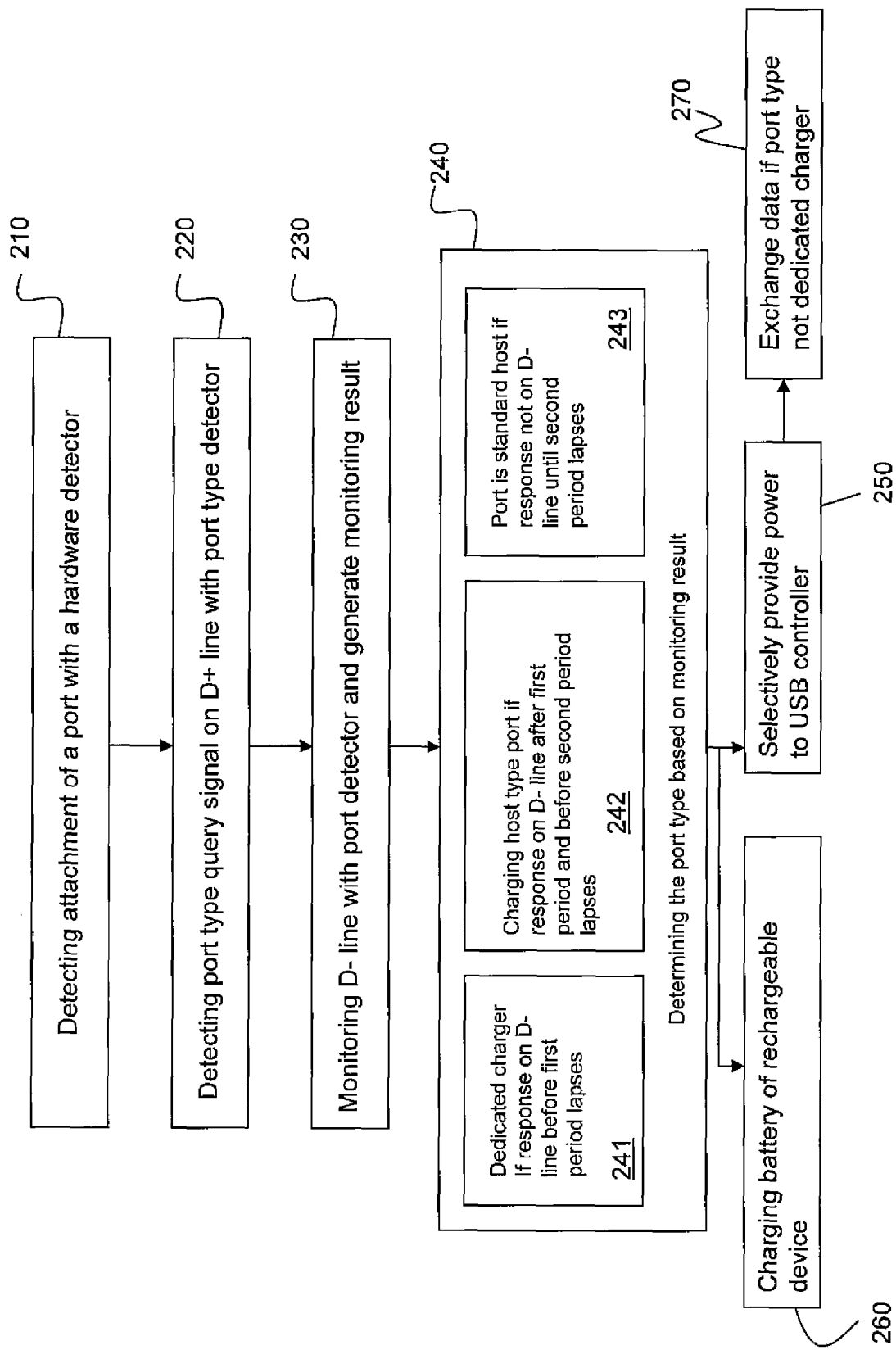
FIG. 3 is a flow chart of a USB port type detection method according to an embodiment of the invention.

FIG. 3 is a flow chart of a method 200 for determining a port type connected to a rechargeable device via a USB connector according to an embodiment of the invention. The method 200 begins at step 210 by detecting, preferably with a hardware detector, an attachment of a port to the rechargeable device via a USB connector. Step 210 is followed by step 220, which is detecting, by a port type detector of the hardware detector, a port type query signal on a positive data line of the rechargeable device. Next, at step 230, the port type monitor monitors the negative datea line of the rechargeable device, to provide a monitoring result. Step 230 may be executed in parallel with step 220 while the monitoring result can be responsive to events that occurred after the detection of the port type query signal.

The port type query signal may be an increase of a positive data line voltage above a predetermined threshold and the port type response signal may be an increase of a negative data line voltage above a predetermined threshold. Step 220 may include comparing the positive data line voltage to the predetermined voltage threshold, and step 230 may include comparing the negative data line voltage to the predetermined voltage threshold. It is noted that the predetermined voltage thresholds of steps 220 and 230 may differ from each other.

Step 230 is followed by step 240, which is determining the type of the port based on the monitoring result. Step 240 may include either one of steps 241, 242 and 243.

Step 241 includes determining that the port is a dedicated charger if a port type response signals appears on the negative data line before a first predetermined period lapses from a detection of the port type query signal, wherein the first timing threshold is shorter than a USB controller port type detection period. Referring to the example set forth in FIG. 2, the first predetermined period may be PP1 131.

Step 242 includes determining that the port is a charging host if the port type response signal appears on the negative data line after the first predetermined period lapses from the detection of the port type query signal and before a second predetermined period lapses from the detection of the port type query signal, where the second predetermined period is longer than the first predetermined period and the second predetermined period is shorter than the USB controller port type detection period (previously discussed). Once again, referring to the example set forth in FIG. 2, the second predetermined period may be PP2 132.

Step 243 includes determining that the port is a standard host if the port type response signals either does not appear on the negative data line or appears after the second predetermined period has lapsed from the detection of the port type query signal. The first predetermined period may be is shorter than 1 millisecond (or substantially equal to 1 millisecond) and the second predetermined period may be substantially equal 40 milliseconds.

Step 240 is followed by step 250 of selectively powering up, by a power management module, a USB controller of the rechargeable device based on the type of the port. In the present invention, the power consumption of the USB controller is higher than a power consumption of a port type monitor. Step 250 may include at least one of the following:

(i) preventing provision of power to the USB controller if the port is a dedicated charger, (ii) preventing provision of power to a communication module of the rechargeable device if the port is a dedicated charger, (iii) providing power to the USB controller if the port is a charging host or a standard host, (iv) providing power to the communication module if the port is a charging host or a standard host.

Either of steps 210, 220, 230 and 240 may be followed by step 260 of charging a battery of the rechargeable device. FIG. 3 illustrates step 260 as being preceded by step 240. Step 250 may be followed by step 270 of exchanging data with the port if the port is not a dedicated charger. The method 200 may be executed by the rechargeable device 10.

In the foregoing specification, the invention has been described with reference to specific examples of embodiments of the invention. It will, however, be evident that various modifications and changes may be made therein without departing from the broader spirit and scope of the invention as set forth in the appended claims.

The connections may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed. The signals may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "de-assert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are illustrative. Multiple operations may be combined into a single operation, a single operation may be distributed in additional operations, and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the hardware detector may be included in the same integrated circuit as the USB controller. Alternatively, the examples may be implemented as any number of separate integrated circuits or separate devices interconnected with each other in a suitable manner. For example, the USB controller may belong to a different integrated circuit then the hardware detector. Also for example, the examples, or portions thereof, may implemented as soft or code representations of physical circuitry or of logical representations convertible into physical circuitry, such as in a hardware description language of any appropriate type. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A rechargeable device, comprising:
  a Universal Serial Bus (USB) connector that allows a port to be connected to the rechargeable device, wherein the USB connector includes a voltage line, a positive data line, a negative data line, and a negative voltage line;
  a USB controller coupled to the USB connector for communicating with the port by way of the USB connector;
  a power management module coupled to the USB controller for selectively enabling the provision of power to the USB controller based on the type of the port connected to the USB connector;

a hardware detector coupled to the USB connector for detecting the type of the port connected to the USB connector, wherein the hardware detector provides a port type query signal on the positive data line, monitors the negative data line for a response signal, generates a monitoring result based on a delay time between transmission of the query signal and receipt of the response signal, and determines the type of the port based on the monitoring result, wherein the hardware detector determines that the port is a dedicated charger when the delay time between the transmission of the query signal and receipt of the response signal is less than a first predetermined period that is shorter than a USB controller port type detection period, and wherein the hardware detector is coupled to the power management module and provides a port type to the power management module, and the power management module turns off power to the USB controller when the port is a dedicated charger such that the USB controller is in an off state.

2. The rechargeable device according to claim 1, wherein the hardware detector determines that the port is a charging host when the delay time between the query signal and the response signal is longer than the first predetermined period and shorter than a second predetermined period.

3. The rechargeable device of claim 2, wherein the second predetermined period is longer than the first predetermined period and shorter than the USB controller port type detection period.

4. The rechargeable device of claim 2, wherein the hardware detector determines that the port is a standard host if the delay time between the query signal and the response signal is longer than the second predetermined period.

5. The rechargeable device of claim 2, wherein the first predetermined period is less than 1 millisecond and the second predetermined period is less than 40 milliseconds.

6. The rechargeable device of claim 5, wherein the first predetermined period is substantially equal to 1 millisecond.

7. The rechargeable device of claim 1, wherein the port type query signal is an increase of voltage above a predetermined threshold on the positive data line and the response signal is an increase of a voltage on the negative data line above the predetermined threshold.

8. The rechargeable device of claim 1, wherein the hardware detector comprises:
a positive data line detection circuit for detecting the port type query signal on the positive data line;
a negative data line detection circuit for detecting the response signal on the negative data line; and
a timing unit connected to the positive and negative data line detection circuits for determining the port type based on the time delay between detection of the query and response signals.

9. The rechargeable device of claim 8, further comprising a port type query signal generator for generating the port type query signal.

10. A method for determining a type of a port connected to a Universal Serial Bus (USB) connector of a rechargeable device, the method comprising:
detecting a port type query signal on a positive data line of the USB connector of the rechargeable device;
monitoring a negative data line of the USB connector of the rechargeable device for a response signal; and
measuring a delay time between the query signal and the response signal;
determining the type of the port based on the delay time;
determining that the port is a dedicated charger if the delay time is less than a first predetermined period that is shorter than a USB controller port type detection period; and
selectively providing power to a USB controller of the rechargeable device based on the determined port type, wherein when the port is a dedicated charger, power to the USB controller is turned off so that the USB controller is in an off state.

11. The method for determining a type of a port of claim 10, comprising determining that the port is a charging host if the delay time is longer than the first predetermined period and shorter than a second predetermined period, wherein the second predetermined period is longer than the first predetermined period and shorter than the USB controller port type detection period.

12. The method for determining a type of a port of claim 11, comprising determining that the port is a standard host if the delay time is greater than the second predetermined period.

13. The method for determining a type of a port of claim 12, wherein the first predetermined period is shorter than 1 millisecond and the second predetermined period is shorter than 40 milliseconds.

14. The method for determining a type of a port of claim 13, wherein the first predetermined period is substantially equal to 1 millisecond.

15. The method for determining a type of a port of claim 10, wherein the port type query signal is an increase in voltage above a predetermined threshold on a positive data line of the USB connector, and the response signal is an increase in voltage above the predetermined threshold on a negative data line of the USB connector.

* * * * *